(12) United States Patent
Paritsky et al.

(10) Patent No.: US 6,924,475 B2
(45) Date of Patent: Aug. 2, 2005

(54) OPTICAL TRANSDUCERS AND METHOD OF MAKING SAME

(75) Inventors: Alexander Paritsky, Modi'in (IL); Alexander Kots, Ashdod (IL)

(73) Assignee: Phone-Or Ltd., Or Yehuda (IL)

( * ) Notice: Subject to any disclaimer, the term of this patent is extended or adjusted under 35 U.S.C. 154(b) by 412 days.

(21) Appl. No.: 10/141,979

(22) Filed: May 10, 2002

(65) Prior Publication Data

US 2003/0209656 A1 Nov. 13, 2003

(51) Int. Cl.$^7$ ................................................ H04B 9/00
(52) U.S. Cl. .................................... 250/231.1; 356/4.01
(58) Field of Search .................................. 250/216, 221, 250/239, 227; 381/172

(56) References Cited

U.S. PATENT DOCUMENTS

| | | | | |
|---|---|---|---|---|
| 3,622,791 A | * | 11/1971 | Bernard | 250/231.19 |
| 5,200,610 A | * | 4/1993 | Zuckerwar et al. | 250/227.21 |
| 5,771,091 A | | 6/1998 | Paritsky et al. | |
| 5,969,838 A | | 10/1999 | Paritsky et al. | |
| 6,091,497 A | | 7/2000 | Paritsky et al. | |
| 6,239,865 B1 | | 5/2001 | Paritsky et al. | |

* cited by examiner

Primary Examiner—David Porta
Assistant Examiner—Tony Ko
(74) Attorney, Agent, or Firm—G. E. Ehrlich (1995) Ltd.

(57) ABSTRACT

An optical transducer includes a light source and a light detector mounted on a base member in laterally spaced relation to each other, a deformable membrane overlying the light source and light detector, and a light transparent body between the light source and light detector on one side, and the deformable membrane on the opposite side, such as to direct light emanating from the light source to the membrane, and to direct light reflected from the membrane to the light detector in accordance with the deformations of the membrane. According to the described method of making the optical transducer, the light source and light detector are enclosed in a first casing closed at one end by the base member and open at the opposite end; and the light transparent body is enclosed in a second casing to be closed at one end by the deformable membrane and open at the opposite end. The two casings are attached to each other with their open ends facing each other such that the light transparent body of the second casing overlies the light source and light detector of the first casing.

23 Claims, 4 Drawing Sheets

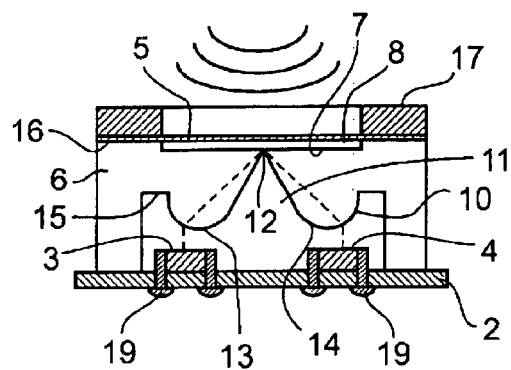
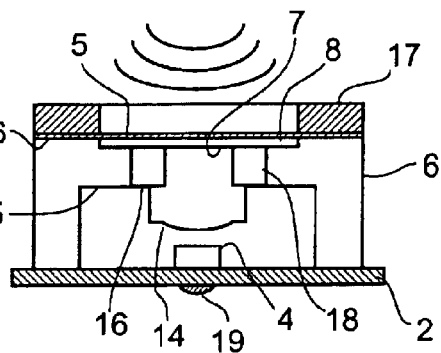
Fig. 1         Fig. 2
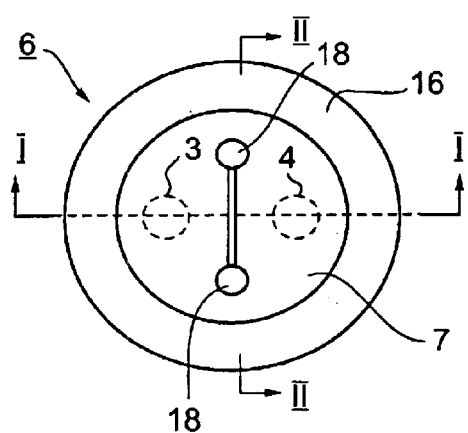
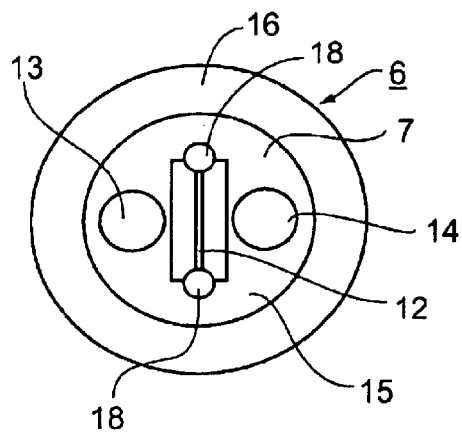
Fig. 3         Fig. 4

OPTICAL TRANSDUCERS AND METHOD OF MAKING SAME

FIELD AND BACKGROUND OF THE INVENTION

The present invention relates to optical transducers (sometimes referred to as optical sensors) which utilize optical means for sensing mechanical displacements, such as movements of a body or deformation of a membrane, and converting them to electrical signals. The invention also relates to methods of making such optical transducers. The invention is particularly useful in making optical microphones for converting sound into electrical signals and is therefore described below especially with respect to this application.

Optical transducers of this type are described, for example, in U.S. Pat. Nos. 5,771,091; 5,969,838; 6,091,497; and 6,239,865, and in International Application PCT/IL02/00241 the contents of which patents and application are incorporated herein by reference.

Such optical transducers generally include an optical unit containing a light source, a laterally spaced light detector and a displaceable member aligned with the optical window defined by the light source and light detector. The displaceable members in the optical transducers described in the above patents are generally in the form of deformable membranes, but may be physically movable members, such as in an accelerometer. Optical transducers of this type can be constructed to be very accurate for measuring very small membrane deformations or other displacements.

In general, the known optical transducers do not readily lend themselves to low-cost mass production, and therefore are relatively expense to produce.

OBJECTS AND BRIEF SUMMARY OF THE INVENTION

One object of the present invention is to provide an optical transducer of a novel construction which more readily permits mass production at relatively low cost. Another object of the invention is to provide a method of producing optical transducers in a manner which permits mass production at relatively low cost.

According to one aspect of the present invention, there is provided an optical transducer, comprising: a light source mounted on a base member; a light detector mounted on the base member spaced laterally of the light source; a deformable membrane overlying the light source and light detector and effective to reflect light from the light source to the light detector in accordance with the deformations of the membrane; and a light transparent body between the light source and light detector on one side and the membrane on the opposite side, the light transparent body being effective to direct light emanating from the light source to the membrane and to direct light reflected from the membrane to the light detector in accordance with the deformations of the membrane; characterized in that: the light source and light detector are enclosed in a first casing closed at one end by the base member and open at the opposite end; the membrane is carried at one end of a second casing and closing the one end of the second casing; the second casing further carries the light transparent body inwardly of the membrane at the one end and is open at the opposite end; and the first and second casings are attached to each other with their open ends facing each other such that the light transparent body of the second casing overlies the light source and light detector of the first casing to direct light emanating from the light source to the membrane, and to direct light reflected from the membrane to the light detector.

According to another aspect of the present invention, there is provided, a method of making an optical transducer having a light source and a light detector mounted on a base member in laterally spaced relation to each other, a deformable membrane overlying the light source and light detector, and a light transparent body between the light source and light detector on one side, and the deformable membrane on the opposite side, such as to direct light emanating from the light source to the membrane, and to direct light reflected from the membrane to the light detector in accordance with the deformations of the membrane; the method comprising: enclosing the light source and light detector in a first casing closed at one end by the base member and open at the opposite end; enclosing the light transparent body in a second casing to be closed at one end by the deformable membrane and open at the opposite end; and attaching the first and second casings to each other with their open ends facing each other such that the light transparent body of the second casing overlies the light source and light detector of the first casing.

According to further features in the described preferred embodiment, the one end of the second casing is closed by an apertured end wall, and the membrane is clamped to the second casing between the apertured end wall and the light transparent body before the first and second casings are attached to each other with their open ends facing each other. In the described preferred embodiment, the first casing is attached to the second casing by bending lugs on one into slots formed in the other.

According to further features in the described preferred embodiment, the light transparent body is fixed within the second casing by a shaped rib formed in one lockingly receivable in a shaped slot formed in the other. More particularly, in the described preferred embodiment, the shaped rib and slot extend longitudinally with respect to the second casing, the shaped rib including a tapered end to guide the rib into the slot, and a locking shoulder engageable with a locking shoulder in the slot for locking the rib within the slot.

According to further features in the described preferred embodiment, the base member is formed, between the light source and light detector, with an opening covered by filtering material for producing a desired directional pattern characteristic with respect to the received acoustical waves.

The invention is particularly useful, and is therefore described below, with respect to the optical transducer described in the above-cited co-pending International Application PCT/IL02/00241 wherein the light transparent body is formed with a circular recess on the surface facing the membrane to space the surface from the membrane, and with a shaped inner surface facing the light source and light detector to direct light emanating from the light source to the membrane, and to direct light reflected from the membrane to the light detector. In the described preferred embodiment, the shaped inner surface of the light transparent body facing the light source and light detector includes a diametrically extending slot defining an air gap having sides which converge towards each other in the direction from the surface facing the light source and light detector towards the surface facing the membrane.

As will be described more particularly below, the foregoing features enable optical transducers to be constructed in a manner which is more efficient than prior art methods, and which also more readily lends itself to low-cost mass production.

Further features and advantages of the invention will be apparent from the description below.

BRIEF DESCRIPTION OF THE DRAWINGS

The invention is herein described, by way of example only, with reference to the accompanying drawings, wherein:

FIGS. 1–4 illustrate the main optical elements of the optical transducer describer herein for purposes of example, the optical transducer being of the construction described in the above-cited International Application PCT/IL02/00241, FIGS. 1 and 2 being sectional views along lines I—I and II—II of FIG. 3, and FIGS. 3 and 4 being top and bottom views, respectively, of the light transparent body of the illustrated optical transducer;

Figure 5:
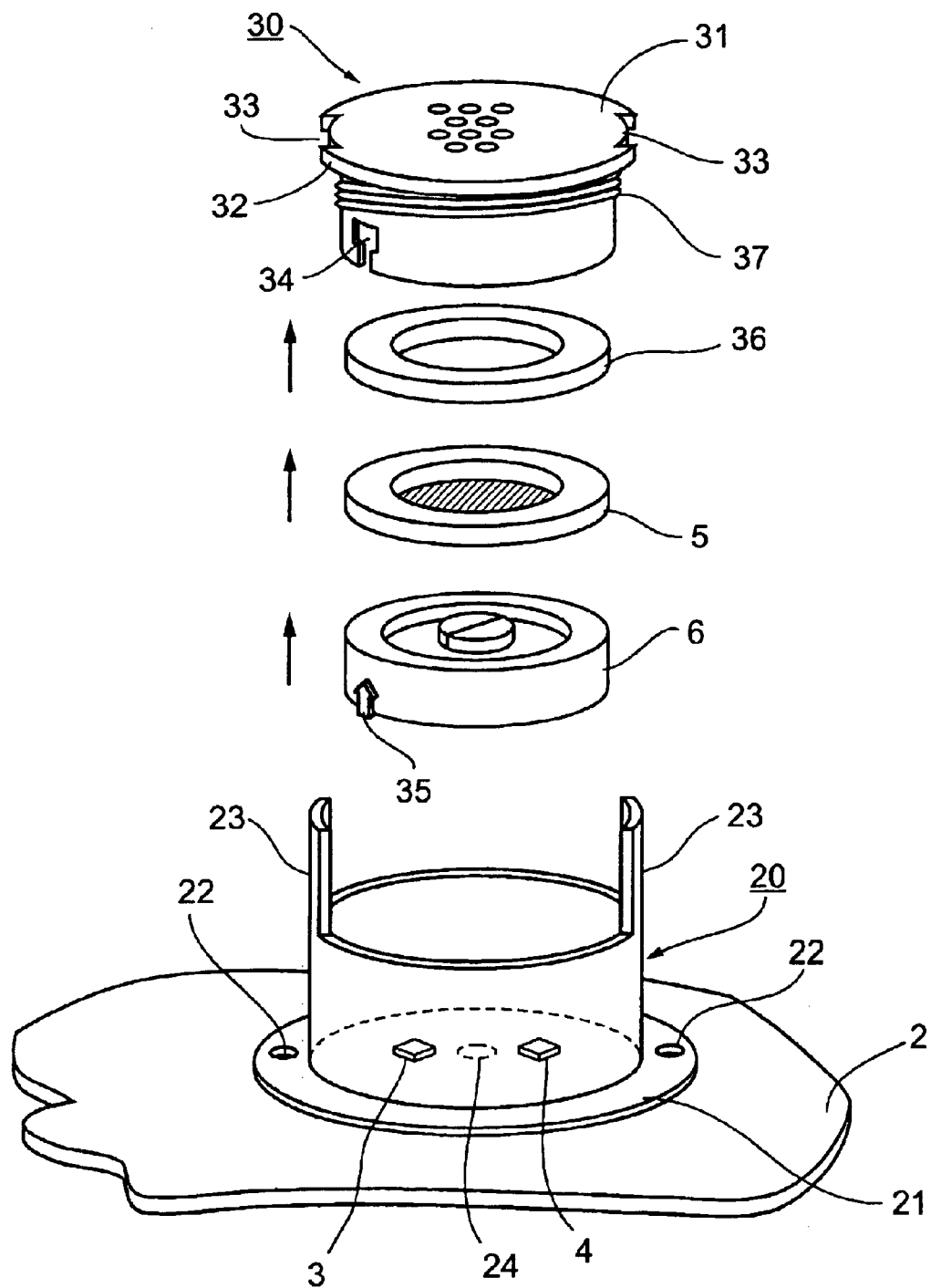
FIG. 5 is an exploded three-dimensional view illustrating the main components of a complete optical transducer constructed in accordance with the present invention and the manner of assembling such components.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt was made to provide more details than necessary to enable one skilled in the art, using routine skill and design, to understand and practice the described invention. It is to be further understood that the embodiment described is for purposes of example only, and that the invention is capable of being embodied in other forms and applications than described herein.

DESCRIPTION OF A PREFERRED EMBODIMENT

The preferred embodiment of the invention described below is based on an optical transducer of generally the same construction as described in the above-cited International Application PCT/IL02/00241 but modified in accordance with the present invention. Such an optical transducer includes a base member 2 mounting a light source 3 and a light detector 4 in laterally spaced relationship to each other, a deformable membrane 5 overlying the light source 3 and light detector 4, and a light transparent body 6 between the light source and light detector on one side, and the deformable membrane 5 on the opposite side. The light transparent member 6 is of generally cylindrical configuration and is formed with a central circular recess 7 on its outer surface to define a small space 8 between it and the inner surface of membrane 5.

The inner surface 10 of the light transparent body 6 facing the light source 3 and light detector 4 is shaped to direct light emanating from the light source 3 to the inner surface of the membrane 5, and also to direct light reflected from the inner surface of the membrane to the light detector 4 in accordance with the deformations of the membrane. The amount of light received by light detector 4, and therefore the output electrical signal produced by the detector, will vary in accordance with the deformations of the membrane 5.

Thus, as shown particularly in FIG. 1, the inner surface 10 of the light transparent body 6 is formed with a diametrically-extending slot defining an air gap 11 having sides which converge from the surface facing the light source 3 and light detector 4 towards the surface facing the membrane 5 where it terminates in a linear slit 12 at the recessed surface 7 of that body. As shown in the bottom view of FIG. 4, slit 12 is a closed slit terminating short of the recessed surface 7 of the light transparent body 6.

The shaped inner surface 10 of the light transparent body 6 is formed of a lens configuration on each of the opposite sides of gap 11. Thus, as shown particularly in FIGS. 1 and 4, the inner surface of body 6 is shaped to define a spherical lens 13 on one side of gap 11, and another spherical lens 14 on the opposite side of the gap. Spherical lens 13 overlies the light source 3 and, as shown by the broken lines in FIG. 1, is effective to direct light from the light source towards slit 12 on the opposite surface 7 of the light transparent body 6; whereas lens 14 overlies the light detector 4 and is effective to direct the light deflected from the inner surface of the membrane 5 to the light detector. Both lenses 13, 14 are enclosed by an annular recess formed in the inner surface of transparent body 6.

The non-recessed portion of the outer surface of the light transparent body 6, namely the annular region 16 surrounding the circular recess 8, serves as a mounting surface for the membrane 5. Thus, as shown particularly in FIGS. 1 and 2, membrane 5 is mounted between the unrecessed annular region 16 of light transparent body 6 and a ring 17, such that the central inner region of the membrane 5 is spaced, by space 8, from the central recessed region 7 of the light transparent body 6. The central region of membrane 5 is therefore able to deform towards and away from slit 12 in accordance with the acoustical waves impinging the outer surface of the membrane.

As shown particularly in FIGS. 3 and 4, the light transparent body 6 may be formed with a pair of axially-extending venting holes 18 at the opposite ends of the slit 12 to minimize a pressure build-up within space 8 during the deformations of the membrane 5, and thereby to better permit the membrane to deform in accordance with the acoustical waves.

Base member 2 may be a printed circuit board (PCB) having the electrically-conductive pathways formed on its outer surface. Light source 3 may be a light emitting diode (LED) electrically connected to the electrically-conductive pathways of the PCB 2 by plated-through holes, schematically shown at 19. Light detector 4 may be a photoconductor electrically connected to the electrically-conductive pathways of the PCB 2 also by plated-through-holes 19.

The printed circuit board PCB 2 may also be used for mounting other electronic components in the system in which the optical transducer is used. For example, the illustrated optical transducer could be an optical microphone used in a mobile telephone, in which case the PCB 2 may include the other electronic components of the optical microphone and of the remainder of the mobile telephone.

Preferably, light source 3 and light detector 4, as well as the other components mounted on the PCB 2, are mounted by a soldering technology in which the lower surface of the PCB is dipped in a solder bath. In such a case, the membrane 5 is preferably not mounted until after the soldering operation has been completed to avoid exposing the membrane to possible damage by the high temperature of the soldering process.

FIGS. 5–8 illustrate an optical transducer of the general construction as illustrated in FIGS. 1–4 but modified to enable the optical transducer to be more readily producible by low-cost mass production. In the illustrated optical transducer, those elements of the basic optical transducer described above with reference to FIGS. 1–4 are identified by the same reference numerals. Thus, FIG. 5 illustrates the PCB 2, the light source 3 and light detector 4 mounted thereon in laterally spaced relationship to each other, the deformable membrane 5 overlying light source 3 and light detector 4, and the light-transparent body 6 interposed between light source 3 and light detector 4 on one side, and membrane 5 on the opposite side.

Figure 6:
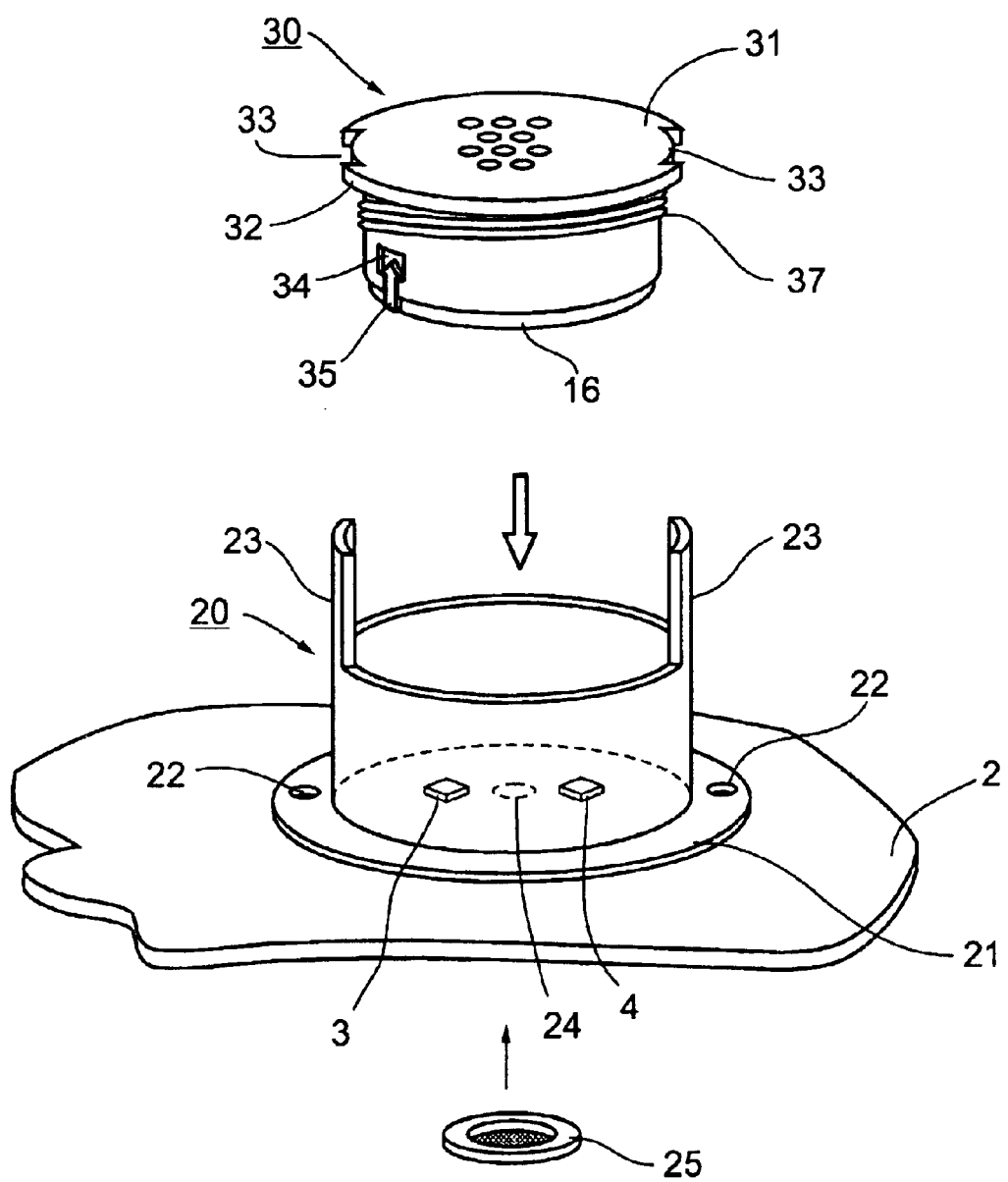
FIG. 6 is a three-dimensional exploded view illustrating the two casings before being assembled together to produce the optical transducer in accordance with the present invention.
Figure 8:
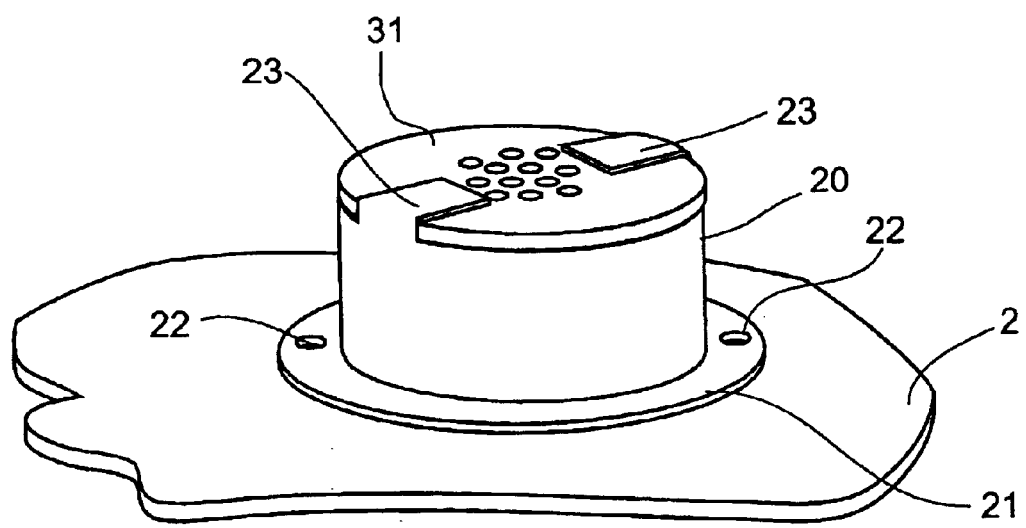
FIG. 8 illustrates the assembled optical transducer.

As shown in FIGS. 5, 6 and 8, the light source 3 and light detector 4 are enclosed within a first casing 20 which is closed at one end by the PCB 2, and is open at the opposite end. As shown particularly in FIGS. 5 and 6, the light transparent body 6 is enclosed in a second casing 30 to be attached to casing 20.

As shown in FIG. 5, casing 20 is integrally formed with an external annular flange 21 for securing the casing to the PCB 2 by means of a plurality of fasteners 22. The opposite, open-end of casing 20 is integrally formed with a pair of diametrically-opposed lugs 23 extending parallel to the longitudinal axis of the casing. In the described embodiment, casing 20 including its lugs 23, is of metal.

In addition, the PCB 2 is formed with an opening therethrough, shown at 24, between the light source 3 and the light detector 4. Opening 24 is adapted to receive a filter material, shown at 25 in FIG. 6, for producing a desired directional pattern characteristic with respect to the acoustical waves received by the illustrated optical transducer.

In the illustrated embodiment, casing 30 is closed at one end by an apertured end wall 31 integrally formed with casing 30, and by the deformable membrane 5 (FIG. 5) interposed between the apertured end wall 31 and the outer surface of the light transparent body 6. The apertured end wall 31 is of larger diameter than casing 30 so as to define an external annular flange 32 formed with a pair of diametrically-opposed slots 33. Casing 30 is further formed with a longitudinally-extending slot 34 along one side adapted to receive a locking rib 35 formed in the light transparent body 6 for fixing the latter body within casing 30. Before fixing the light transparent body 6 to the casing 30, a rubber ring 36 is inserted within the casing, followed by the insertion of the deformable membrane 5, such that when the light transparent body 6 is fixed within the casing 30, the deformable membrane 5 is firmly clamped between the outer surface of transparent body 6 and the inner surface of the annular flange 32 of apertured end wall 31.

Figure 7:
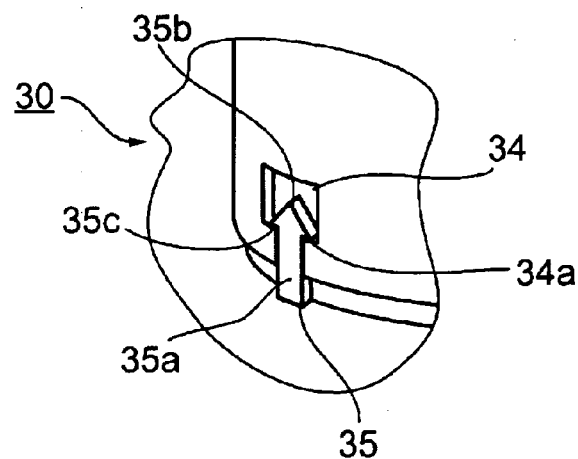
FIG. 7 is an enlarged fragmentary view illustrating the manner of fixing the light transparent body to its respective casing before that casing is fixed to the other casing.

FIG. 7 particularly illustrates the construction of locking rib 35 integrally formed in the light transparent body 6, and the slot 34 in the case 30 for securing the light transparent body 6 within the casing, with the membrane 5 and rubber ring 36 clamped between body 6 and flange 32 of the apertured end wall 31. Thus, as shown in FIG. 7, rib 35 includes a section 35a extending in the longitudinal direction with respect to casing 30, a tapered leading edge 35b for guiding the rib with respect to slot 34, and locking shoulder 35c engageable with locking shoulders 34a formed in slot 34 for locking the rib within the slot.

Casing 30 is integrally formed with one or more sealing rings 37 on its outer surface engageable with the inner surface of casing 20 when the two casings are attached together, as described more particularly below.

The illustrated optical transducer is produced in the following manner:

First, PCB 2 is formed with the light source 3 and the light detector 4 at laterally spaced locations as described above with respect to FIG. 1, except that, in this case, the PCB 2 is also formed with an opening 24 between the light source and light detector. The metal casing 20 is then secured to the upper side of PCB 2 by fasteners 22, with the lugs 23 at the open end of the casing extending upwardly, as shown in FIGS. 5 and 6. The underside of PCB 2 may then be dipped in a solder bath to make the electrical connections between the conductive pattern on the underside of PCB 2 with the light source 3 and light detector 4 on the upper side of the PCB, as well as the electrical connections for any of the other electrical components on PCB 2, as described above with respect to FIGS. 1–4.

As a separate operation which may be performed before or after assembling casing 20 to the PCB 2 in the manner described above, the deformable membrane 5 and the light transparent body 6 are assembled within the second casing 30. This may be conveniently done by inserting, through the open end of casing 30, first the rubber ring 36, then the membrane ring 5, and finally the light transparent body 6. When the light transparent body 6 is inserted, its rib 35 is aligned with slot 34 in the casing 30, and the transparent body is then pressed inwardly of the casing until the locking shoulder 35c on rib 35 snaps over the locking shoulder 34a of the slot 34 in body 6, as shown in FIG. 7.

After the foregoing elements have been assembled within casing 30, casing 30 is oriented to align its slots 33 with the lugs 23 of casing 20. The lugs 23 are then bent-over the outer surface of the apertured end wall 31 of casing 30, as shown in FIG. 8, to firmly fix the two casings together.

Slots 33 and 34, rib 35 and lugs 23 are located so as to orient the light transparent body 6 within the casing 30, with respect to the light source 3 and light detector 4 within casing 20, such that the lens 13 and 14 (FIG. 1) of the light transparent body 6 overlie the light source 3 and light detector 4, as shown in FIG. 1. When so oriented, the light transparent body 6 directs light emanating from the light source 3 to the center region of the deformable membrane 5, and directs light reflected from the membrane to the light detector 4, such that the light detector will produce an output signal corresponding to the deformations of the membrane.

The filtering hole 24 through the PCB 2, between the light source 3 and light detector 4, may be filled with or covered by any suitable filtering material 25 according to the directional pattern characteristic desired to be produced with respect to the received acoustical waves. This may be done as the final manufacturing operation, or at any convenient stage during the production of the optical transducer. For example, if a figure-of-eight pattern is desired, a soft filtering material would be used; if a cardioid or super-cardioid pattern is desired, a more dense filtering material would be used; and if an omni-directional pattern is desired, the filtering material would be very dense.

It will be appreciated that the above-described method of producing optical transducers can be conveniently implemented in automated operations and thereby lends itself to volume production at relatively low cost. Casing 30, containing the deformable membrane 5, may be assembled to casing 20 after the soldering operations have been performed with respect to casing 20 so that the heat or other conditions during the soldering operations, or other operations in assembling casing 20 to the PCB 2, cannot deleteriously affect the very sensitive membrane.

While the invention has been described with respect to a preferred embodiment, it will be appreciated that many variations may be made. For example, the light transparent body 6 could be of other constructions, including the other constructions described in the above cited International Application PCT/IL02/00241. In addition, the apertured end wall 31 could be produced as a separate cap applied (e.g., by threading) to case 30 containing the membrane 5, rather than being integrally formed with that casing. Further, other means could be used for attaching the two casings 20, 30, together, at their respective open ends.

Many other variations, modifications and applications of the invention will be apparent.

What is claimed is:

1. An optical transducer, comprising:
   a light source mounted on a base member;
   a light detector mounted on said base member spaced laterally of the light source;
   a deformable membrane overlying said light source and light detector and effective to reflect light from said light source to said light detector in accordance with the deformations of said membrane;
   and a light transparent body between said light source and light detector on one side and said membrane on the opposite side, said light transparent body being effective to direct light emanating from the light source to the membrane and to direct light reflected from the membrane to the light detector in accordance with the deformations of the membrane;
   characterized in that:
   said light source and light detector are enclosed in a first casing closed at one end by said base member and open at the opposite end;
   said membrane is carried at one end of a second casing and closing said one end of the second casing;
   said second casing further carries said light transparent body inwardly of said membrane at said one end and is open at the opposite end;
   said first and second casings are attached to each other with their open ends facing each other such that the light transparent body of the second casing overlies the light source and light detector of the first casing to direct light emanating from said light source to the membrane, and to direct light reflected from the membrane to the light detector;
   and said first easing is formed with an external annular flange receiving fasteners for securing the first casing to said base member.

2. The optical transducer according to claim 1, wherein said second casing includes an end wall overlying said membrane and apertured to expose said membrane to acoustical waves.

3. The optical transducer according to claim 2, wherein said light transparent body is fixed within the two casings to clamp the membrane therein between the light transparent body and said apertured end wall.

4. The optical transducer according to claim 3, wherein said light transparent body is fixed within said second casing by a shaped rib formed in said transparent body lockingly receivable in a shaped slot formed in said second casing.

5. The optical transducer according to claim 4, wherein said shaped rib and slot extend longitudinally with respect to said second casing, said shaped rib including a tapered end to guide the rib into said slot, and a locking shoulder engageable with a locking shoulder in said slot for locking the rib within the slot.

6. The optical transducer according to claim 4, wherein said shaped rib and said slot are located to orient said second casing with respect to said first casing, such that the light transparent body of the second casing directs light emanating from said light source in the first casing to the membrane, and reflects light from the membrane to the light detector in the first casing.

7. The optical transducer according to claim 2, wherein said membrane is carried by a membrane ring receivable between said apertured end wall of the second casing and said light transparent body.

8. The optical transducer according to claim 2, wherein said apertured end wall is formed with an external annular flange, and said second casing further includes at least one sealing ring between said membrane and said external annular flange of said apertured end wall.

9. The optical transducer according to claim 2, wherein said first casing includes a plurality of longitudinally extending lugs at said open end thereof, and said apertured end wall includes a plurality of slots for receiving said lugs to secure said second casing to said first casing.

10. The optical transducer according to claim 9, wherein said first casing, and the lugs thereof are of metal.

11. The optical transducer according to claim 1, wherein said second casing is integrally formed with one or more sealing rings on its outer surface enagageable with the inner surface of said first casing when attached thereto.

12. The optical transducer according to claim 1, wherein said base member is formed, between said light source and light detector, with an opening covered by filtering material for producing a desired directional pattern characteristic with respect to the received acoustical waves.

13. The optical transducer according to claim 1, wherein said light transparent body is formed with a circular recess on the surface facing the membrane to space said surface from the membrane, and with a shaped inner surface facing said light source and light detector to direct light emanating from the light source to the membrane and to direct light reflected from the membrane to the light detector.

14. The optical transducer according to claim 13, wherein said shaped inner surface of the light transparent body facing the light source and light detector includes a diametrically extending slot defining an air gap having sides which converge towards each other in the direction from the surface facing the light source and light detector towards the surface facing the membrane.

15. The optical transducer according to claim 14, wherein said shaped inner surface of the light transparent body is formed of a lens configuration on each of the opposite sides of said slot, one of said lens configurations directing the light from said light source onto the center of the membrane, the other of said lens configurations directing the light from the center of the membrane onto the light detector.

16. The optical transducer according to claim 14, wherein said diametrically extending slot in the light transparent body terminates at the surface of the light transparent body facing said membrane in a diametrically extending slit closed at its opposite ends.

17. The optical transducer according to claim 16, wherein said light transparent body is formed with holes on the opposite sides of said closed slit to equalize the pressure on the opposite sides of said membrane.

18. A method of making an optical transducer having a light source and a light detector mounted on a base member in laterally spaced relation to each other, a deformable membrane overlying the light source and light detector, and a light transparent body between the light source and light detector on one side, and said deformable membrane on the opposite side, such as to direct light emanating from the light source to the membrane, and to direct light reflected from the membrane to the light detector in accordance with the deformations of said membrane; said method comprising:

enclosing said light source and light detector in a first casing closed at one end by the base member and open at the opposite end;

enclosing said light transparent body in a second casing to be closed at one end by said deformable membrane and open at the opposite end;

and attaching said first and second casings to each other with their open ends facing each other such that the light transparent body of the second casing overlies said light source and light detector of the first casing;

said first casing being formed with an external annular flange receiving fasteners for securing the first casing to said base member.

19. The method according to claim 18, wherein said one end of the second casing is closed by an apertured end wall, and said membrane is clamped to the second casing between said apertured end wall and said light transparent body before the first and second casings are attached to each other with their open ends facing each other.

20. The method according to claim 19, wherein said first casing is attached to said second casing by bending lugs on one of said casings into slots formed in the other of said casings.

21. The method according to claim 19, wherein said light transparent body is fixed within said second casing by a shaped rib formed in said transparent body lockingly receivable in a shaped slot formed in said second casing.

22. The method according to claim 21, wherein said shaped rib and slot extend longitudinally with respect to said second casing, said shaped rib including a tapered end to guide the rib into said slot, and a locking shoulder engageable with a locking shoulder in said slot for locking the rib within the slot.

23. The method according to claim 18, wherein said base member is formed, between said light source and light detector, with an opening covered by filtering material for producing a desired directional pattern characteristic with respect to the received acoustical waves.

* * * * *